Jan. 31, 1933.  L. C. CHASSEY  1,895,783
BLEEDER VALVE LOCK AND RELEASE
Filed April 16, 1931
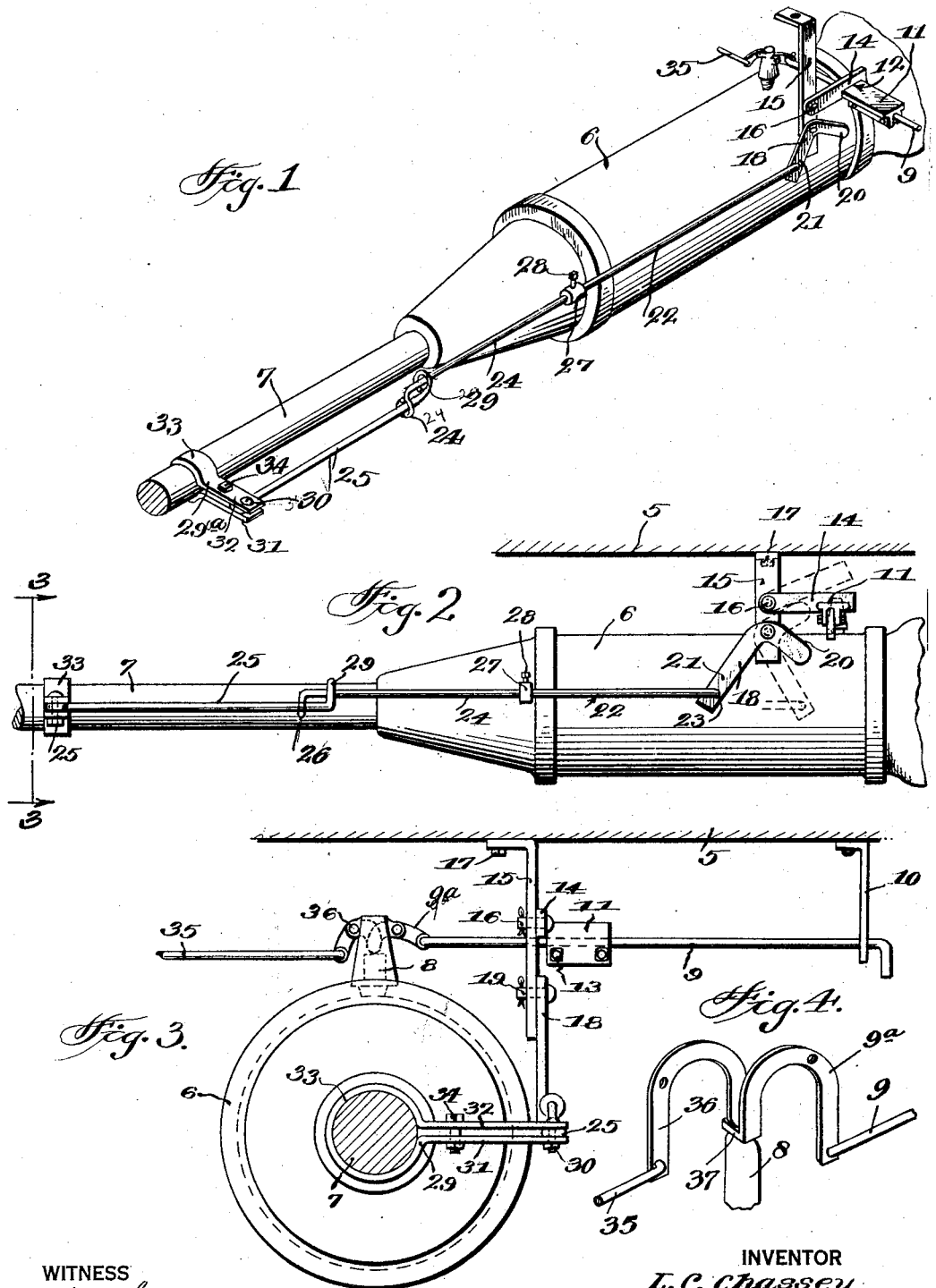

Patented Jan. 31, 1933

1,895,783

UNITED STATES PATENT OFFICE

LEZIME C. CHASSEY, OF NEW BEDFORD, MASSACHUSETTS

BLEEDER VALVE LOCK AND RELEASE

Application filed April 16, 1931. Serial No. 530,621.

My invention relates to bleeder valves for air brakes on railway cars and particularly to means for locking these valves in open position and for automatically releasing the same so that the valve will be automatically closed.

At the present time, when a freight train arrives at a terminal and is brought to a stop, all brakes are set by air. The engine is then uncoupled from the train, leaving the brakes set and it then becomes necessary to bleed the brake cylinders on the individual cars by hand. In order that this may be done, it is common to have a bleeder valve on the brake cylinder, which valve is provided with a rod known as a bleeder rod which extends outwardly to the side of the car so that the person designated to bleed the brakes may pull on the bleeder rod thus opening the valve and releasing the pressure in the brake cylinder. This bleeding operation usually takes from one to three minutes depending upon the condition of the bleeder valve and the amount of pressure in the cylinder. At the present time it is necessary for the operator to stand and hold the bleeder rod in open position until the brake is fully bled. It will thus be seen that it will take one man a considerable length of time to bleed the brakes on a long string of freight cars.

The principal object of the present invention is to provide a means whereby the bleeder rod may be locked in valve opening position until the brake is fully bled and will then operate to release the bleeder rod, allowing the valve to close automatically.

It is another object of the invention to provide a lock in connection with the bleeder rod which will act to hold the rod in valve opening position when it is drawn to this position by a person designated to bleed the brakes, whereby it will only be necessary for said person to draw the rod to valve opening position and then release the same, the rod being automatically locked in this position by my invention.

It is a further object of the invention to provide an automatic bleeder lock release which may be installed upon brakes systems now in use upon cars without in any way altering said brakes or which may be manufactured in connection with new brakes and made an integral part thereof.

A still further object of the invention is to provide a bleeder lock and release which will be composed of a minimum number of parts, which will not be likely to get out of order and one which will be very cheap to manufacture and maintain upon the car.

Other important objects and advantages will become apparent during the course of the following detailed description, taken in conjunction with the accompanying drawing forming a part of this application, in which:

Figure 1 is a perspective view of an embodiment of the invention;

Fig. 2 is a side elevation thereof; and

Fig. 3 is a sectional view taken on the line 3—3 of Fig. 2.

Fig. 4 is a fragmentary view in perspective of the cooperating means for actuating the bleeder valve.

Referring now to the drawing in detail, wherein like references refer to like parts throughout the same, 5 indicates the under side of a railway car, preferably a freight car, which is provided with any conventional air brake system now in common use, such brake system including a cylinder 6 having a piston, not shown, reciprocating therein, which through a piston rod 7 operates the brake rigging on the car. The particular construction of the mechanism thus far described has no bearing whatever upon my invention, being merely a conventional showing of the well known type of air brake.

The pressure cylinder 6 is provided with a manually controlled bleeder valve 8 of any well known construction, such bleeder valve 8 being operated through a suitable linkage 9ª including a pull rod 9, commonly designated a "bleeder rod". The bleeder rod 9 extends from the bleeder valve 8 to the side of the car, the outer end of the rod being supported by a bracket 10, or by any other suitable means.

For the purpose of providing a means for locking the bleeder rod in valve opening position as shown in Figs. 1, 2 and 3, said rod is provided with a casting 11 which is rigidly secured to the rod intermediate of the ends thereof, said casting being cut off square at the inner end thereof to present a shoulder 12. The casting 11 may be provided with a bifurcated skirt which straddles the rod 9, the casting being clamped to the rod by means of bolts 13. Any other convenient means of attaching the casting to the rod may be resorted to such as welding or the like. A pivoted latch or keeper element 14 having one end pivotally secured to a depending L-shaped bracket 15 through the medium of a pivot pin 16, is adapted to rest upon the upper edge of the casting 11 when the bleeder valve is in closed position and is adapted to fall behind the shoulder 12 when the bleeder rod is drawn to valve opening position thereby locking the rod in said position. The depending L-shaped bracket 15 is secured to the under surface of the car 5 by means of a bolt 17.

To provide for the release of the keeper member 14 so as to provide for the automatic closing of the bleeder valve, a locking latch releasing lever 18 is pivotally secured to the depending bracket 15, below the pivot point of the latch 14 as at 19. The locking member 18 is in the form of a bell crank, one arm thereof having a rounded upper surface 20 which is adapted to bear against the under face of the latch 14 as shown in dotted lines of Fig. 2 when the other arm of the bell crank is moved forwardly, as also shown in dotted lines.

The arm 21 of the bell crank lever 18 is preferably formed slightly longer than the other arm thereof and has an operating rod 22 pivotally secured to the lower end thereof as at 23. The rod 22 extends along the side of the cylinder 6 and preferably parallel with the piston rod 7. The operating rod 22 is composed of two relatively movable sections 24 and 25, the free end of the rod 24 being provided with two spaced stops 26 and 27. The stop 26 on the end of the rod is in the form of an eye which embraces the rod section 25, acting as a guide as well as a stop. The stop 27 is in the shape of a slidable collar which may be locked in any adjusted position by means of a set screw 28. The section 25 of the rod 22 has one end formed with an eye 29 which embraces the rod section 24 between the stops 26 and 27. The other end of the rod section 25 is pivotally secured to the outer end of the bracket 29$^a$ as at 30. The bracket 29$^a$ is in the shape of a strap having two parallel laterally extending arms 31 and 32, the intermediate portions between said arms being formed into an eye 33 for the reception of the piston rod 7. The bracket 29$^a$ is clamped in adjusted position on the piston rod 7 by means of a nut and bolt 34. It will readily be seen that the nut and bolt 34 will draw the arms 31 and 32 together thereby tightly clamping the rod 7 in the eye 33 and preventing movement of the bracket 29$^a$ on the piston rod 7.

It will be readily seen that the portion 25 of the rod 22 will move with the piston rod 7 at all times, but that the section 24 of the said rod will only be moved when the eye 29 of the section 25 engages either one of the stops 26 or 27. By providing for this limited relative movement of the sections 24 and 25 of the rod 22 together with stops 26 and 27, the bleeder rod may be automatically released at any desired point in the bleeding of the cylinder 6. In Figs. 1 and 3, a second bleeder rod 35 is shown as extending to the other side of the car 5, this second rod is preferably interconnected with the bleeder rod 9, through a suitable linkage 36 so that opening of the bleeder valve 8 through the rod 35 will also result in outward movement of the rod 9, allowing the locking mechanism to operate the same as described above. For this purpose, a suitable foot 37 is provided on the lever or linkage 9$^a$ which is engaged by the free end of the lever 36 for depressing the levers 9$^a$ and likewise the valve 8, as shown in Fig. 4.

It will of course be understood that in the normal running of the car, the bleeder valve will remain closed at all times and the latch 14 will rest upon the upper surface of the casting 11, this being the inoperative position. When the train reaches its terminal and it is desired to bleed the cylinder 6 of the car 5, the brakeman or other operator merely pulls on the bleeder rod 9 and then lets go. When this is done, the brake being in set position and the piston rod 7 being extended from the cylinder 6 as shown in Figs. 1, 2 and 3, the latch 14 will fall behind the casting 11 and when the bleeder rod 9 is released the shoulder 12 will abut against said keeper thereby preventing the return of the bleeder rod to normal position and holding the bleeder valve 8 open. As the cylinder is bled, the piston rod 7 will slowly travel to the right and at the completion of the bleeding of the cylinder the eye 29 of the rod section 25 will engage against the stop 27 thereby urging the arm 21 of the bell crank to the dotted line position shown in Fig. 2, which as will be readily understood will result in the raising of the latch 14 by the arm 20 of said bell crank thereby causing said latch or keeper 14 to clear the casting 11 to permit the bleeder rod 9 to return to normal position and allow the closing of the bleeder valve 8. It will thus be seen that I have provided an extremely simple and entirely automatic bleeder valve lock and release which will save the loss of any time and which may be readily attached to existing brake systems.

Although a preferred embodiment of the invention has been shown and described, it will be understood that various changes in the details of construction may be made without departing from the spirit of the invention as defined by the appended claims.

I claim:

1. The combination with a brake cylinder having a piston rod and a bleeder valve; of a bleeder rod for operating said valve, a protuberance rigidly secured to said bleeder rod and forming a shoulder, a pivoted keeper element engageable with said shoulder to lock said bleeder rod in adjusted position, and located at right angles to the bleeder rod a rocking lever engageable with said keeper element and a connection between said lever and said piston rod whereby to rock said lever into engagement with said keeper to disengage the latter from the shoulder upon movement of said piston rod to brake releasing position, said connection including a bracket carried by said piston rod and an operating rod between said bracket and one end of said rocking lever, the keeper element normally resting on the protuberance.

2. The combination with a brake cylinder having a piston rod and a bleeder valve; of a bleeder rod for opearting said valve, a protuberance carried by said bleeder rod and forming a shoulder, a pivoted keeper element engageable with said shoulder to lock said bleeder rod in adjusted position, a rocking lever engageable with said keeper element and a connection between said lever and said piston rod whereby to rock said lever into engagement with said keeper to disengage the latter from the shoulder upon movement of said piston rod to brake releasing position, said connection including a bracket carried by said piston rod, a rod connected at one end to said operating lever, a pair of spaced stops carried by said rod, and a second rod connected at one end to said bracket on said piston rod and having an eye formed at the other end thereof, said eye surrounding said other rod between the stops thereon whereby to permit relative movement of said rods prior to operation of said lever.

LEZIME C. CHASSEY.